US012783357B2

(12) United States Patent
Allen et al.

(10) Patent No.: US 12,783,357 B2
(45) Date of Patent: Nov. 3, 2026

(54) POWER PROTECTION DURING UNEXPECTED POWER LOSS

(71) Applicant: Dell Products L.P., Round Rock, TX (US)

(72) Inventors: Gregory M. Allen, Layton, UT (US); Ricardo V. Dominguez, Georgetown, TX (US); Jeffrey James Demoss, Austin, TX (US); Anthony Ginty, Douglas (IE)

(73) Assignee: Dell Products L.P., Round Rock, TX (US)

( * ) Notice: Subject to any disclaimer, the term of this patent is extended or adjusted under 35 U.S.C. 154(b) by 225 days.

(21) Appl. No.: 18/650,304

(22) Filed: Apr. 30, 2024

(65) Prior Publication Data

US 2025/0335303 A1 Oct. 30, 2025

(51) Int. Cl.

*G06F 11/14* (2006.01)
*G06F 1/30* (2006.01)
*G06F 3/06* (2006.01)

(52) U.S. Cl.

CPC ............ *G06F 11/1441* (2013.01); *G06F 1/30* (2013.01); *G06F 3/0619* (2013.01)

(58) Field of Classification Search

CPC ... G06F 11/14; G06F 1/30; G06F 3/06; G06F 11/1441; G06F 3/0619; G06F 1/28

USPC .......................................................... 361/131

See application file for complete search history.

(56) References Cited

U.S. PATENT DOCUMENTS

| | | | | |
|---|---|---|---|---|
| 2019/0041938 | A1* | 2/2019 | Zupanc | G06F 1/30 |
| 2021/0036540 | A1* | 2/2021 | Suljic | G11C 5/141 |
| 2023/0118479 | A1* | 4/2023 | Oyama | G01J 3/26<br>356/454 |
| 2023/0324970 | A1* | 10/2023 | Lu | G06F 1/30<br>713/300 |
| 2023/0418479 | A1* | 12/2023 | Chodem | G06F 3/0655 |
| 2024/0186818 | A1* | 6/2024 | Vijayvargiya | G06F 1/26 |

* cited by examiner

*Primary Examiner* — Danny Nguyen
(74) *Attorney, Agent, or Firm* — WOMBLE BOND DICKINSON (US) LLP

(57) ABSTRACT

Methods and systems for storing data are disclosed. Data may be stored in persistent storage. Until stored in persistent storage, the data may be temporarily stored in transitory storage. If power loss occurs before the data from the transitory storage is stored in persistent storage, power protection circuitry may be used to provide temporary power. The temporary power may enable a graceful shut to be performed. The graceful shut down may reduce the likelihood of data being lost due to unexpected losses of power.

20 Claims, 6 Drawing Sheets

POWER PROTECTION DURING UNEXPECTED POWER LOSS

FIELD

Embodiments disclosed herein relate generally to device management. More particularly, embodiments disclosed herein relate to systems and methods to onboard devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
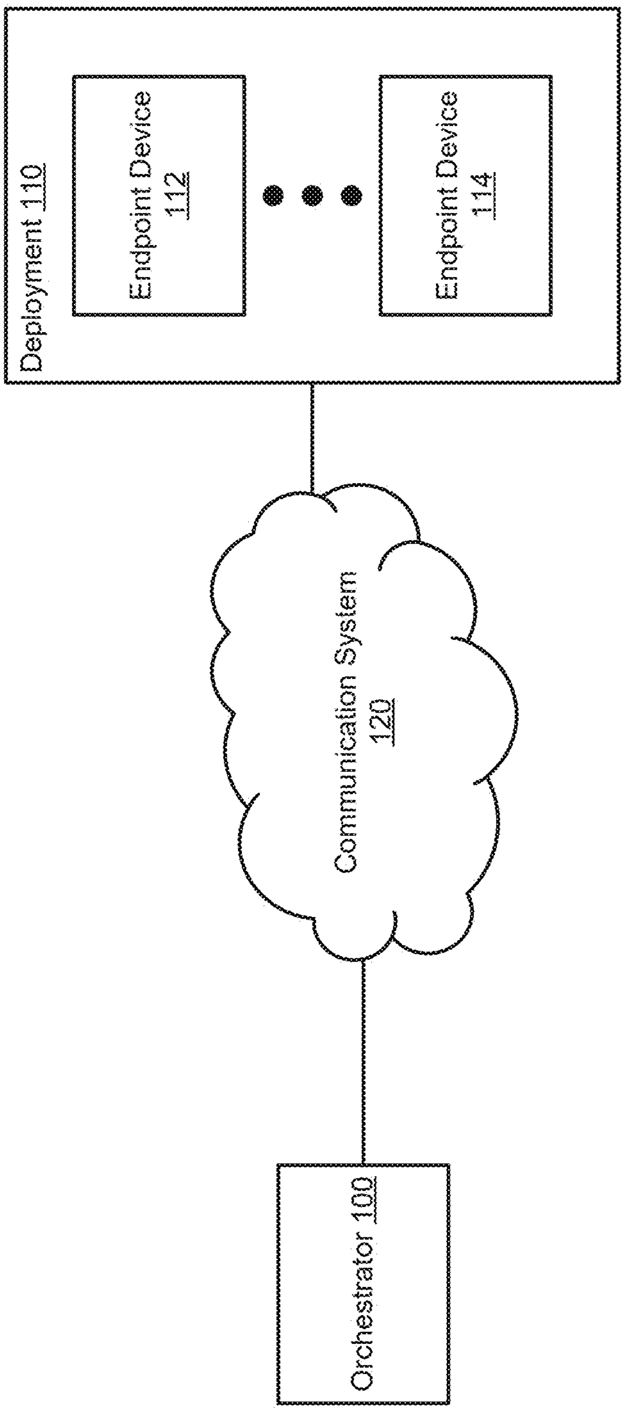
FIGS. 1A-1C show block diagrams illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, various endpoint devices may perform various actions and communicate with one another. To do so, data may be generated, used, and stored for future use.

Storage devices may be used to store the data for future use. During operation, the storage devices may consume power. If power become unavailable unexpectedly, then the storage devices may be at risk of losing data (e.g., may need to perform certain operations so that data is not lost, but may require to do so).

To reduce the likelihood of data being lost, the storage devices may include power protection circuitry. The power protection circuitry may store and provide power to facilitate graceful shutdowns of storage devices which may reduce the likelihood of data loss. The power protection circuitry may include self-diagnostic capabilities through which failed power storage components may be identified and addressed by the power protection circuitry. By addressing the failed power storage components proactively, the power protection circuitry may be more likely to be able to provide power to facilitate performance of graceful shutdowns.

By doing so, endpoint devices may be less likely to suffer data losses due to unexpected losses of power. Thus, embodiments disclosed here may address, in addition to others, the technical problem of data loss through self-diagnostic and remediation functionality.

In an embodiment, a data processing system is provided. The data processing system may include a processor a storage device. The storage device may include memory for temporarily storing data; persistent storage for permanently storing data; and power protection circuitry adapted to temporarily provide power to the storage device when the data processing system unexpectedly loses power. The power protection circuitry may include capacitor banks for storing the power prior to occurrences of unexpected losses of power, and an isolation mechanism adapted to electrically isolate any capacitor banks of the capacitor banks that suffer capacitor failures.

The capacitor banks may be over provisioned with respect to a quantity of power necessary to complete a shutdown procedure for the storage device.

The isolation mechanism may be adapted to electrically isolate each of the capacitor banks that has suffered a capacitor failure from other capacitor banks of the capacitor banks that have not suffered any capacitor failures.

The isolation mechanism may include diodes that that are positioned to isolate output for each of the capacitor banks.

The isolation mechanism may also include current limiters for that limit current draw by each of the capacitor banks.

The isolation mechanism may include transistors that are adapted to selectively electrically float each of the capacitor banks.

The isolation mechanism may include a local controller adapted to use the transistors to selectively electrically float each of the capacitor banks based on a state reading of the capacitor banks.

The local controller may be adapted to monitor a charge level of the capacitor banks; in an instance of the charge level being below a threshold: and perform a diagnostic procedure to identify any of the capacitor banks that have suffered a capacitor failure.

The local controller is may be further adapted to send control signals to the transistors corresponding to the any of the capacitor banks that have suffered a capacitor failure to float the any of the capacitor banks that have suffered a capacitor failure. The controls signal may electrically isolate the transistors corresponding to the any of the capacitor banks that have suffered a capacitor failure from a ground for the storage device to eliminate voltage potentials across the transistors corresponding to the any of the capacitor banks that have suffered a capacitor failure.

The capacitor banks may include solid state capacitors that are subject to the capacitor failures.

In an embodiment, as storage device as discussed above is provided.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, transaction processing services, and/or any other type of service that may be implemented with a computing device.

To provide the computer implemented services, the system may include various distributed components. The components may cooperate to provide the computer implemented services.

During operation of the distributed components, any of the components may generate, send, and/or otherwise utilize information. However, if access to the information is lost, then the distributed components may not be able to operate as desired, and may prevent computer implemented services from being provided and/or may impair the provisioning of the computer implemented services.

For example, consider a scenario where a computer implemented services that is being provided is a database service. To provide such services, information may be stored and provided over time. To store the information, the information may be encoded as data on one or more storage devices.

However, if the storage devices do not properly store the data, then access to the encoded information may be lost. For example, if a storage device is instructed to but fails to store data, then the information may become inaccessible. Inaccessibility of the information may prevent the database services from being provided as desired/expected (e.g., may not be able to provide information previously believed to be retrievable in the future).

In general, embodiments disclosed herein may provide methods, systems, and/or devices for managing the operation of distributed systems to provide computer implemented services. To manage the distributed system, storage devices of the distributed system may utilize power protection circuitry to reduce the impact of unexpected losses of power. The power protection circuitry may, when a power loss unexpectedly occurs, continue to provide power to components of the storage devices for a duration of time that enables other components of the storage devices to perform graceful shutdown procedures. Performing the graceful shutdown procedures may reduce the likelihood of data loss from occurring.

For example, if a graceful shutdown is not performed, then data that has not yet been stored in persistent storage of a storage device may be lost. Prior to storage in persistent storage, the data may be temporarily stored in transitory storage. Power loss to the transitory storage may result in loss of the copy of the data stored in the transitory storage. In contrast, power loss to the persistent storage may not result in loss of the copy of the data stored in the persistent storage.

To improve the likelihood of graceful shutdown procedures being performed over time, the power protection circuitry may include self diagnostic and remediation functionality. For example, the power protection circuitry may, over time, assess the functionality of its own components and perform remediations for portions of its own components that are found to be impaired. By doing so, the power protection circuitry may be more likely to be able to continue to provide power to facilitate graceful shutdowns even as components of the power protection circuitry degrade.

For example, the power protection circuitry may include capacitors that may be used to store energy for use when power to a host system is unexpectedly lost. The capacitors may suffer failures modes that may, for example, short circuit the leads of the capacitors (e.g., due to internal shorting within the capacitor). If placed in parallel with one another, the aforementioned short circuits may limit the ability of the capacitors to charge (e.g., the short circuit may eliminate or reduce voltage potentials across the capacitors). To address such scenarios, the power protection circuitry may include mechanisms for electrically isolating capacitors (and/or aggregations of parallel capacitors and/or other configurations such as in series, such as capacitor banks) so that a failed capacitor is less likely to prevent other capacitors from charging.

By doing so, embodiments disclosed herein may provide data processing systems that are less likely to suffer data loss. Consequently, the data processing systems may be more likely to be able to provide desired computer implemented services over longer durations of time.

To provide the above noted functionality, the system of FIG. 1A may include orchestrator 100, deployment 110, and communication system 120. Each of these components is discussed below.

Deployment 110 may provide desired computer implemented services. To do so, deployment 110 may include any number of endpoint devices (e.g., 112-114) that may cooperatively and/or independently provide the computer implemented services. The endpoint devices may host various software (e.g., executing applications) that may generate, transmit, and/or otherwise utilize data in their operation. To reduce the likelihood of the endpoint devices from being unable to provide the computer implemented services (e.g., due to lack of access to data due to data storage device failures), the endpoint devices may include data storage devices that include power protection circuitry with self-diagnostic and/or remediation functionality. Refer to FIGS. 1B-2B for additional details regarding storage devices.

Orchestrator 100 may manage operation of deployment 110. To do so, orchestrator 100 may provide data to and use data provided by endpoint devices 112-114. Thus, if endpoint devices 112-114 are unable to use or provide data to orchestrator 100 due to, for example, data loss, then orchestrator 100 may also be unable to provide all, or a portion, of its functionality.

Figure 2A:
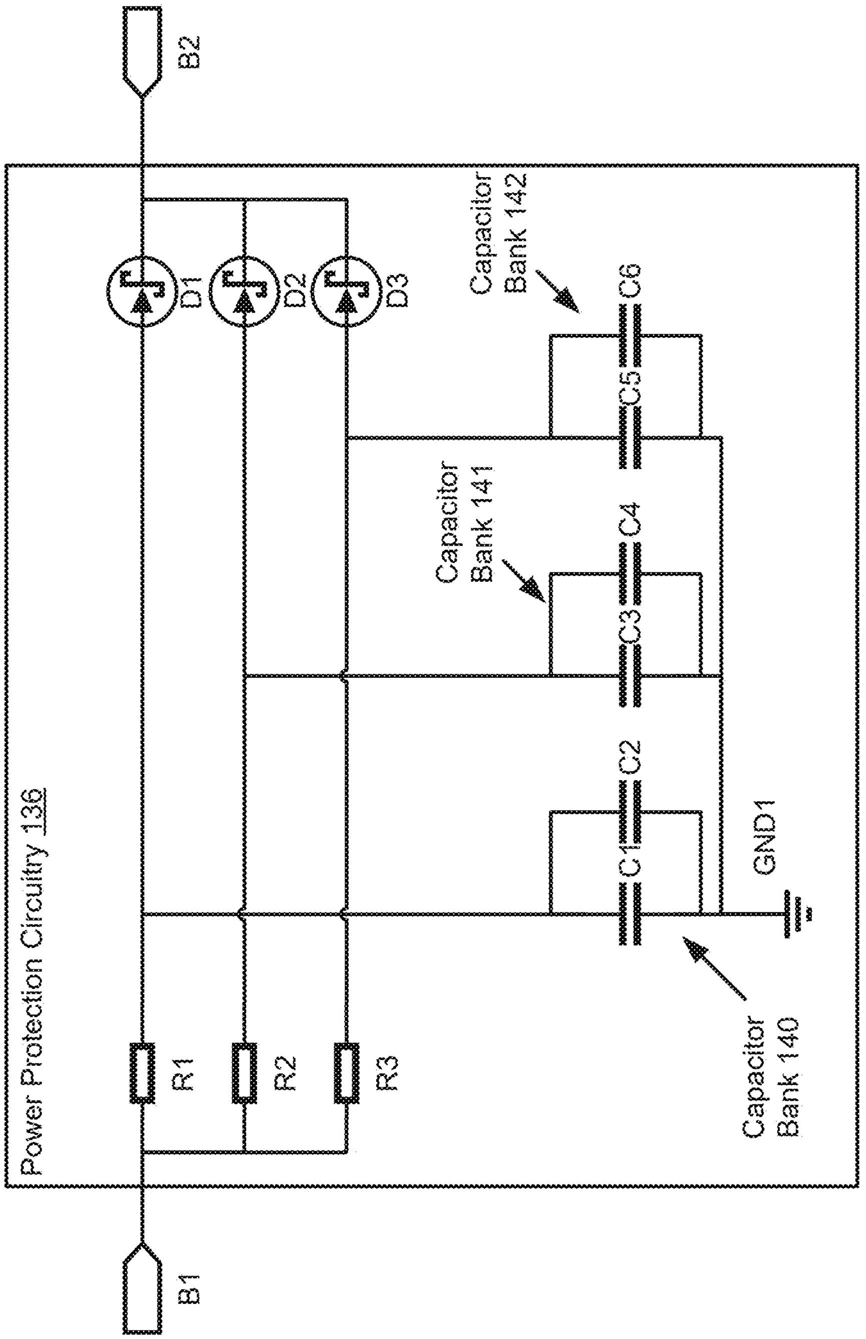
FIGS. 2A-2B show schematic diagrams in accordance with an embodiment.
Figure 2B:
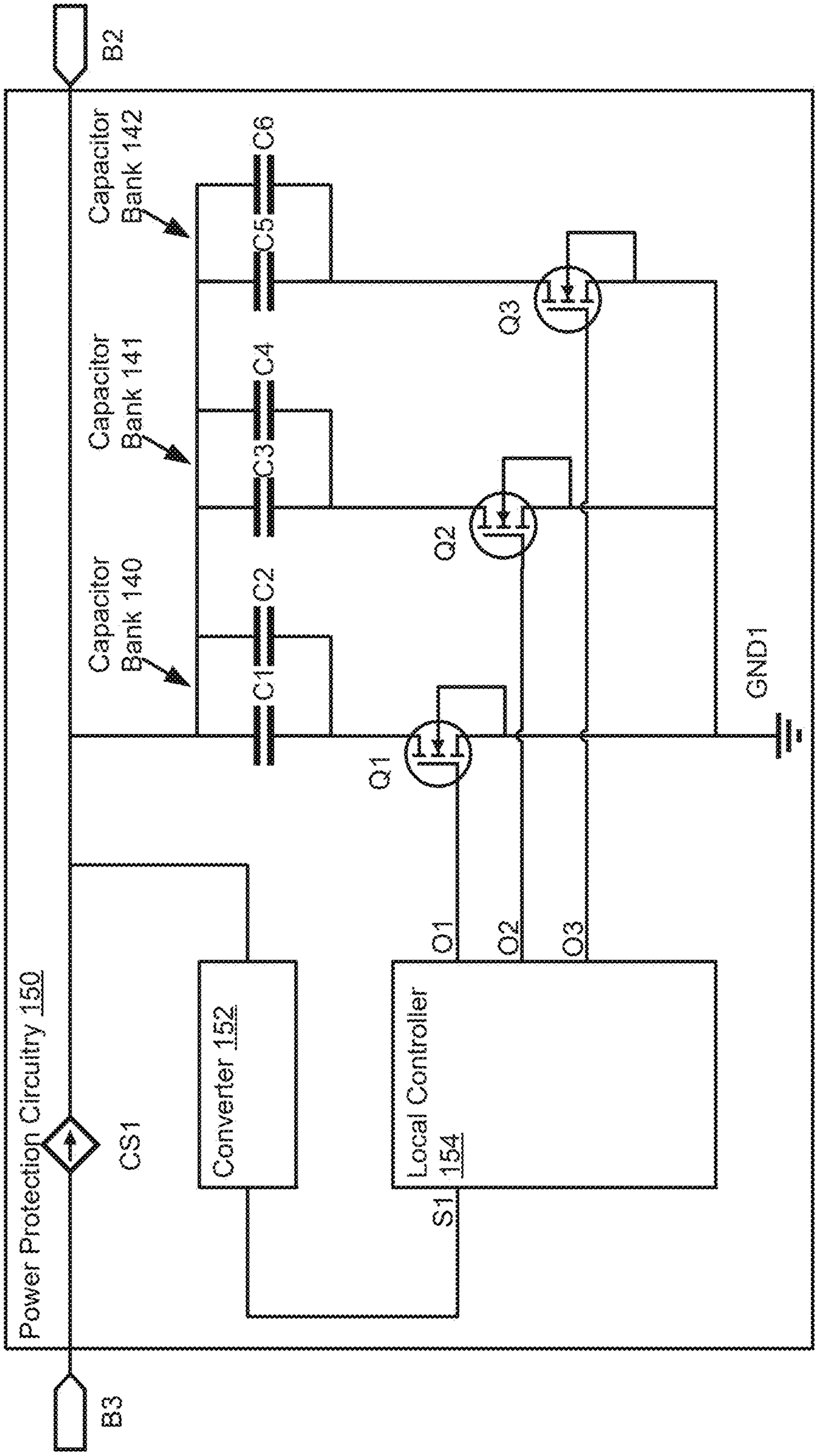
Figure 3:
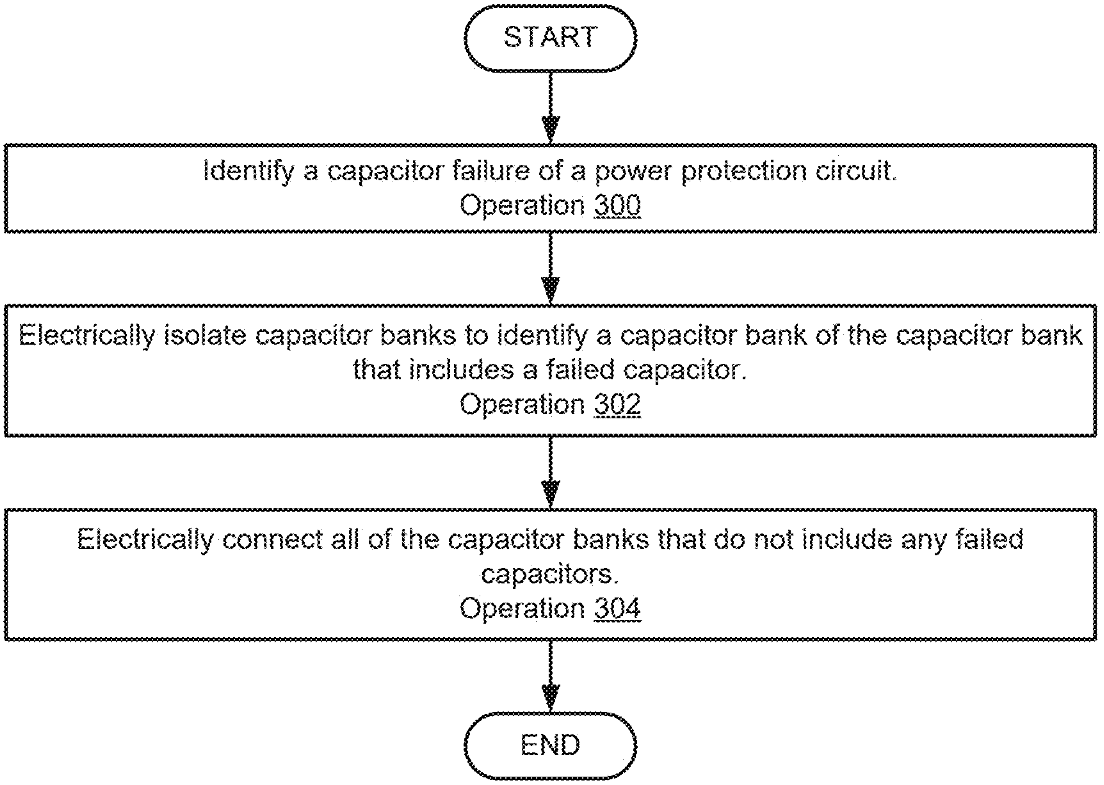
FIG. 3 shows a flow diagram illustrating a method in accordance with an embodiment.

When providing their functionality, any of (and/or components thereof) orchestrator 100 and deployment 110 may perform all, or a portion, of the actions and methods illustrated in FIGS. 2A-3.

Any of (and/or components thereof) orchestrator 100 and deployment 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

Figure 1B:
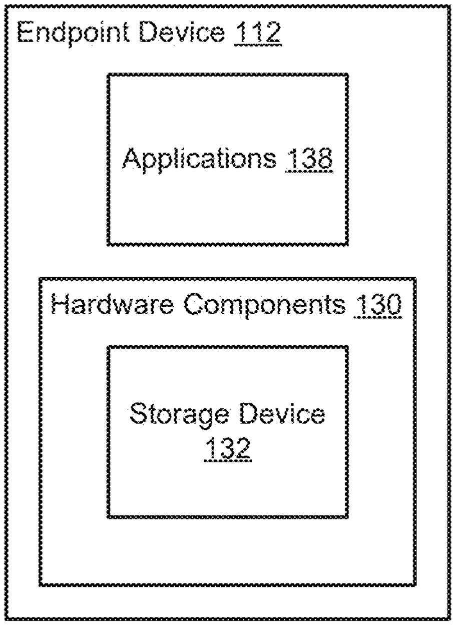

Turning to FIG. 1B, a diagram of endpoint device 112 in accordance with an embodiment is shown. Any of the endpoint devices of the system of FIG. 1A may be similar to endpoint device 112.

To provide desired computer implemented services, endpoint device 112 may include any type and quantity of hardware components 130 (e.g., processors, memory modules, etc.). Hardware components 130 may support execution of various applications 138 which may provide the computer implemented services.

Hardware components 130 may include storage device 132. Storage device 132 may be implemented using, for example, a solid state storage device. If storage device 132 fails to store data on behalf of applications 138 (e.g., as requested), then the data expected to be accessible by applications 138 in the future may be inaccessible. Consequently, operation of applications 138 may be impaired (e.g., may fail to operate, may operate in less desired manners, etc.).

Figure 1C:
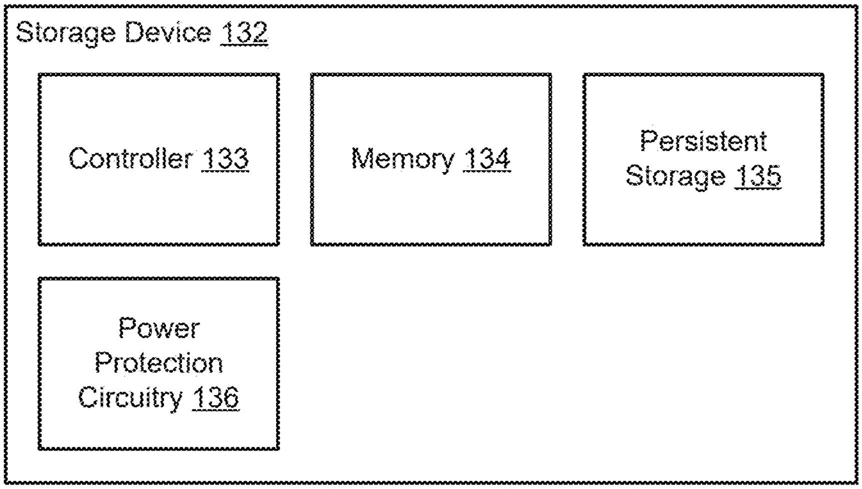

Turning to FIG. 1C, a diagram of storage device 132 in accordance with an embodiment is shown. To facilitate storage of data, storage device may include controller 133, memory 134, persistent storage 135, and power protection circuitry 136. Each of these components is discussed below.

Controller 133 may manage storage of data in storage device 132. For example, controller 133 may obtain read/write/deletion requests from a host system, and update information in persistent storage 135 (e.g., solid state storage media) based on the obtained commands from the host system.

Memory 134 may be transitory storage used by controller 133. For example, when commands and/or data from a host system is received, the commands and/or data may be temporarily stored in memory 134 until used to update data stored in persistent storage 135.

Persistent storage 135 may include any amount of persistent storage (e.g., such as solid state based data storage chips). Persistent storage 135 may include a more limited access speed when compared to memory 134. Thus, data may be staged with memory 134 until persistent storage 135 is able to store the data.

Power protection circuitry 136 may facilitate performance of graceful shutdowns of storage device 132. During operation, controller 133, memory 134, and persistent storage 135 may consume power. When power from the host system become unavailable unexpectedly, controller 133 may initiate performance of a graceful shutdown. The graceful shutdown may place storage device 132 in a state in which it can recover, when repowered, from the unexpected loss of power without losing data. For example, data from memory 134 and/or other information may be stored with persistent storage 135, and/or other operations may be performed to avoid data loss. If a graceful shutdown is not performed, then data loss may occur.

To facilitate performance of graceful shutdowns, power protection circuitry 136 may include power storage components usable to power storage device 132 for a period of time after power from the host system is lots so that a graceful shutdown may be performed. To do so, power protection circuitry 136 may include power storage components (e.g., capacitors), and management components (e.g., isolation mechanisms) that adapt operation of power protection circuitry 136 over time as various power storage components fail (e.g., may short circuit themselves). The operation of the power protection circuitry may be adapted to compensate for loss of power storage components over time. By doing so, storage device 132 may be more likely to be able to perform graceful shutdowns for longer durations of time and with higher reliability. Refer to FIGS. 2A-2B for additional information regarding power protection circuitry.

Turning to FIG. 2A, a first schematic diagram of an example of power protection circuitry 136 in accordance with an embodiment is shown. To facilitate provisioning of power when power from a host system is unexpectedly lost, power protection circuitry 136 may include any number of capacitor banks (e.g., 140-143). While shown in this example as including 3 capacitor banks, it will be appreciated that power protection circuitry may include any number of capacitor banks.

Each capacitor bank may include a number of capacitors (e.g., C1 and C2 with respect to capacitor bank 140) in parallel with each other (and/or in other configurations). Each of the capacitors may, while power is available from a host system, receive the power from the host system to charge the capacitors in the bank. For example, in FIG. 2A, power may be provided via tap point B1 in this schematic diagram. B1 may operably connect to voltage regulators or other components so that power at a desired voltage/current level is available to each of the capacitor banks. Resistors (e.g., R1-R3) corresponding to each of the capacitor banks may be used to limit current draw by the capacitor banks.

Each of the capacitor banks may also be connected to an output tap (e.g., B2). A Diode (e.g., D1-D3, e.g., part of an isolation mechanism) may also be positioned in line with the output tap to limit current from flowing back toward any of the capacitor banks. By doing so, in the event that a capacitor of one of the capacitor banks enters a failure mode, the short circuit may not similarly short out the other capacitor of the other capacitor banks.

For example, if capacitor C1 enters a failure mode in which it short circuits, the terminal across the capacitor may short circuit capacitor C2. However, diode D1 may prevent the short circuit from also short circuiting the capacitors of the other capacitor banks. Thus, if a failure of a capacitor occurs which results in the terminals of the capacitor being shorted to one another, the short circuit may not (or may only to a limited extent) impact operation of the other capacitors. For example, capacitors C3-C6 may remain charged and able to discharge when power from tap B1 (e.g., host power) is lost. Thus, power may continue to flow out of tap B2. B2 may be connected to other power components which may use the power to power the controller (e.g., 133), memory (e.g., 134), and persistent storage (e.g., 135) of the storage device for a duration of time in which a graceful shut down may be performed.

The capacitance ratings, resistor values, diode types, numbers of capacitors in each capacitor bank, and number of capacitor banks may be selected based on (i) the duration of time needed to perform a graceful shut down, (ii) a level of reliability (e.g., target life) for power protection circuitry 136, (iii) statistical failure likelihoods of the capacitors, and/or other factors (e.g., capacitor charge time, current draw in the event that a capacitor is shorted, etc.) that enable a desirable duration of operation for power protection circuitry 136 to be obtained (e.g., 5-7 years, 7+ years, etc.). For example, power protection circuitry 136 may be overprovisioned with capacitor banks when manufactured so that over time, as capacitors enter failure mode, power protection circuitry 136 is able to continue to provide power for desired amounts of time to facilitate graceful shut downs, and is likely to be able to do so for desired amounts of time as capacitors continue to fail.

Turning to FIG. 2B, a second schematic diagram of an example of power protection circuitry 136 in accordance with an embodiment is shown. To facilitate provisioning of power when power from a host system is unexpectedly lost, power protection circuitry 136 may include any number of capacitor banks (e.g., 140-143), as discussed with respect to FIG. 2A. While shown in this example as including 3 capacitor banks, it will be appreciated that power protection circuitry may include any number of capacitor banks.

Each capacitor bank may include a number of capacitors (e.g., C1 and C2 with respect to capacitor bank 140) in parallel with each other (and/or in other configurations). Each of the capacitors may, while power is available from a host system, receive the power from the host system to charge the capacitors in the bank. For example, in FIG. 2B, power may be provided via tap point B3 in this schematic diagram. B3 may operably connect to voltage regulators or other components (not shown). The power may be used to drive current source CS1. The current source may use the power to provide a constant current, so long as power is available.

To address failures of capacitors C1-C6, power protection circuitry 150 may include converter 152, local controller 154, and any number of transistors (e.g., Q1-Q3) (e.g., all part of an isolation mechanism). As seen from the schematic diagram, the transistors may operably connect each of the capacitor banks to a common ground (e.g., GND1). The transistors may be used as switches to operably connect or disconnect the capacitors banks with respect to the ground.

For example, when Q1 is switched to open, capacitor bank 140 may not be connected to ground. Thus, current from the current source may not flow into the capacitors. In contrast, when Q1 is switched to closed, capacitor bank 140 may be connected to ground. Accordingly, current from the current source may flow through the capacitors toward the ground, thereby charging the capacitors (e.g., until fully charged and/or for maintaining the charge).

While transistor Q1 is closed, if a capacitor of capacitor bank 140 fails and shorts itself out, the current source may be directly shorted to the ground which may cause the current source to fail or operate in undesirable manners. Therefore, if a capacitor of capacitor bank 140 fails and shorts itself out, opening of transistor Q1 may disconnect the shorted capacitor thereby returning operation of the current source to a desired/expected mode.

Each of the transistors may be controlled by local controller 154. For example, local controller 154 may include various outputs (e.g., O1-O3) that are operably connected to the transistors. Thus, local controller 154 may change the state of each transistor from open to closed, and the reverse, by changing the value output (e.g., digital or analog). In this manner, local controller 154 may reconfigure the operation of the capacitor banks to address failed capacitors.

To identify when a capacitor has failed, local controller 154 may read the voltage level at the output of the current source using converter 152. Converter 152 may be an analog to digital converter, and may read the voltage level at the output of the current source. If the voltage level falls below a predetermined level, local controller 154 may conclude that a capacitor of one of the capacitor banks has failed.

When such a determination is made, local controller 154 may perform an iterative evaluation process to identify the failed capacitor bank(s). During the iterative process, local controller 154 may selectively use the transistors to electrically float (e.g., open the transistor corresponding to) each capacitor bank. While a capacitor bank is rendered electrically floating (e.g., not grounded), local controller 154 may read the voltage at the output of the current source over time. If the voltage level begins and continues to increase (e.g., to predefined levels), then local controller 154 may conclude that one of the capacitors of the capacitor bank that is electrically floating has failed.

However, if the voltage level does not increase (e.g., to the predefined levels), then local controller 154 may conclude that none of the capacitors of the capacitor bank that is electrically floating has failed.

In an embodiment, to iteratively evaluate capacitor banks, local controller 154 may float all of the capacitor banks and then systematically connect capacitor banks (e.g., one at a time) and monitors for voltage drops in the output due to a newly connected capacitor bank. Such a voltage drop may indicate that at least one of the capacitors in the newly connected capacitor bank is internally shorted.

Local controller 154 may iterate through each of the capacitor banks and/or combinations of capacitor banks in this manner to identify capacitor bank(s) that have suffered capacitor failures, to identify whether sufficient numbers of capacitor banks are operational to enable power to continue to flow during unexpected losses of power (e.g., notifications may be issued by a storage device if insufficient numbers of capacitor banks are operational, the notification may warn that the storage device is not protected against unexpected losses of power), etc. Information regarding the capacitor banks that have suffered capacitor failures may be stored by local controller 154. For example, the information may be stored in persistent storage such that a record of operational and inoperable capacitor banks is maintained such that known inoperable capacitor banks are not retested in the future.

Once the iterative evaluation of the capacitor banks is completed, local controller 154 may reconfigured the transistors based on the information obtained during the iterative evaluation. For example, local controller 154 may open the transistors corresponding to each of the capacitor banks which are believed to have suffered a capacitor failure. Doing so may electrically isolate the capacitor banks that are likely to have suffered the capacitor failure.

While described with respect to performing the iterative evaluation based on a measured voltage level (e.g., falling below a predetermined level), the iterative evaluation process may be performed based on other information. For example, the iterative evaluation may be performed periodically (e.g., in accordance with a schedule), may be performed in response to certain events (e.g., a host system being powered on and reporting that its likely to remain powered on, and/or that the power supplied by the host is healthy and/or likely to continue to be provided), and/or may be performed for other reasons. In this manner, power protection circuitry 150 may be more likely to successfully provide power in the future throughout proactive self-analysis and remediation.

While illustrated in FIGS. 2A-2B as including specific types and numbers of components, it will be appreciated that power protection circuitry may include different types of components, additional components, and/or fewer components without departing from embodiments disclosed herein. For example, the resistor shown in FIG. 2A may be replaced with constant current sources (and/or constant current sources may be replaced with resistors), the transistors shown in FIG. 2B may be replaced with relays, etc.

As discussed above, the components of FIG. 1A may perform various methods to manage operation of endpoint devices. FIG. 3 illustrates a method that may be performed by the components of the system of FIGS. 1A-2B. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing operation of an endpoint device in accordance with an embodiment is shown. The method may be performed by any of the components of the system shown in FIGS. 1A-2B.

At operation 300, a capacitor failure of a power protection circuit is identified. The capacitor failure may be identified by monitoring voltage level across capacitor banks. If the voltage level falls below a threshold level, then it may be concluded that one of the capacitor banks has suffered a capacitor failure. For example, when charged, the capacitors of the capacitor banks may have a prescribed level of voltage on them. However, a short circuit may cause some or all of the capacitor banks to entirely or partially discharge thereby reducing the voltage. Thus, measurement and comparison of the actual voltage to an expected voltage for charged capacitors may be used to conclude that at least one of the capacitors of the capacitor banks has failed.

At operation 302, a capacitor bank that hosts the at least one failed capacitor is identified. The identification may be made by electrically isolating capacitor banks iteratively. While isolated, the voltage drop across the capacitors may be measured. If the voltage drop increases, then it may be concluded that the capacitor bank that is electrically isolated from the other capacitor bank include one of the failed capacitors.

The capacitor bank may be isolated by opening a transistor which operably connects the capacitor bank to electrical ground.

Each of the capacitor banks and/or groups of the capacitor banks may be iteratively evaluated in this manner to identify the capacitor banks that include failed capacitors that have entered a short circuit failure mode.

At operation 304, all of the capacitor banks that do not include any failed capacitors are electrically connected. For example, transistors corresponding to each of these capacitor banks may be closed. In contrast, the capacitor banks that do include failed transistors may be electrically isolated by opening corresponding transistors.

In this manner, only capacitor banks with operable capacitors may remain active in the power protection circuitry. Accordingly, failed capacitors may be disable and prevent from impacting operations of the capacitors that have not failed.

The method may end following operation 304.

Thus using the method illustrated in FIG. 3, embodiments disclosed herein may improve the likelihood of graceful shutdowns of storage devices being performed, thereby reducing the likelihood of occurrences of data loss due to unexpected losses of power.

Figure 4:
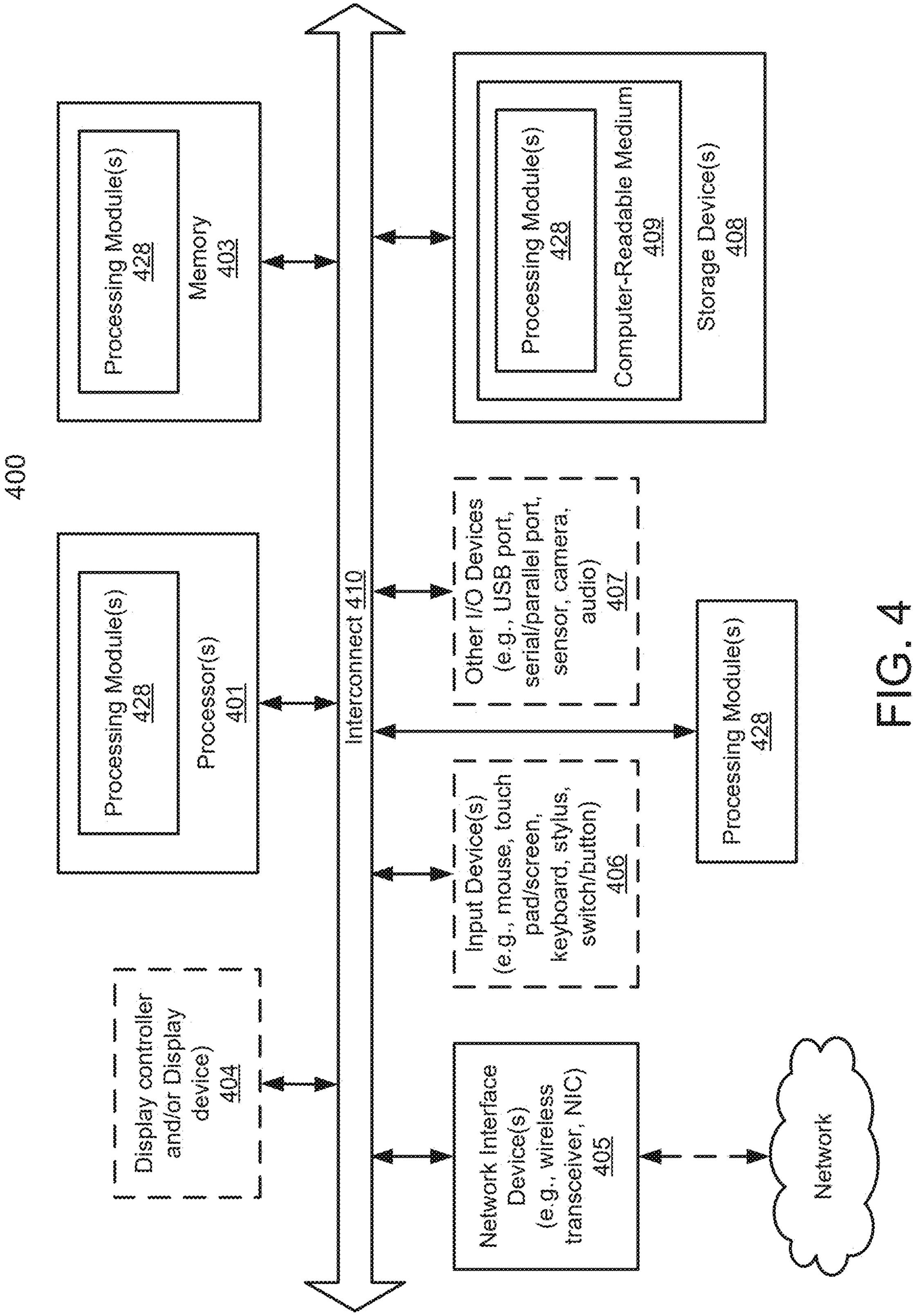
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A data processing system, comprising:
- a processor; and
- a storage device, comprising:
  - memory for temporarily storing data;
  - persistent storage for permanently storing data; and
  - power protection circuitry adapted to temporarily provide power to the storage device when the data processing system unexpectedly loses power, the power protection circuitry comprising:
    - capacitor banks for storing the power prior to occurrences of unexpected losses of power, wherein a number of the capacitor banks and a number of capacitors that make up each of the capacitor banks are selected based on a duration of time needed to perform a graceful shutdown of the storage device, a target life for the power protection circuitry, a statistical failure likelihood of each of the capacitors selected for the capacitor banks, and electrical characteristics exhibited by a respective capacitor of the capacitors when the respective capacitor fails, and
    - an isolation mechanism adapted to electrically isolate any capacitor banks of the capacitor banks that suffer capacitor failures.

2. The data processing system of claim 1, wherein the capacitor banks are over provisioned with respect to a quantity of power necessary to complete a shutdown procedure for the storage device.

3. The data processing system of claim 1, wherein the isolation mechanism is adapted to electrically isolate each of the capacitor banks that has suffered a capacitor failure from other capacitor banks of the capacitor banks that have not suffered any capacitor failures.

4. The data processing system of claim 3, wherein the isolation mechanism comprises diodes that that are positioned to isolate output for each of the capacitor banks.

5. The data processing system of claim 4, wherein the isolation mechanism further comprises current limiters that limit current draw by each of the capacitor banks.

6. The data processing system of claim 3, wherein the isolation mechanism comprises transistors that are adapted to selectively electrically float each of the capacitor banks.

7. The data processing system of claim 6, wherein the isolation mechanism comprises a local controller adapted to use the transistors to selectively electrically float each of the capacitor banks based on a state reading of the capacitor banks.

8. The data processing system of claim 7, wherein the local controller is adapted to:
- monitor a charge level of the capacitor banks; and
- in an instance of the charge level being below a threshold:
  - perform a diagnostic procedure to identify any of the capacitor banks that have suffered a capacitor failure.

9. The data processing system of claim 8, wherein the local controller is further adapted to:
- send control signals to the transistors corresponding to the any of the capacitor banks that have suffered the capacitor failures to float the any of the capacitor banks that have suffered the capacitor failures,
- wherein the controls signal electrically isolate the transistors corresponding to the any of the capacitor banks that have suffered the capacitor failures from a ground for the storage device to eliminate voltage potentials across the transistors corresponding to the any of the capacitor banks that have suffered the capacitor failures.

10. The data processing system of claim 1, wherein the capacitor banks comprise solid state capacitors that are subject to the capacitor failures.

11. A storage device, comprising:
- memory for temporarily storing data;
- persistent storage for permanently storing data; and
- power protection circuitry adapted to temporarily provide power to the storage device when a data processing system hosting the storage device unexpectedly loses power, the power protection circuitry comprising:
  - capacitor banks for storing the power prior to occurrences of unexpected losses of power, wherein a number of the capacitor banks and a number of capacitors that make up each of the capacitor banks are selected based on a duration of time needed to perform a graceful shutdown of the storage device, a target life for the power protection circuitry, a statistical failure likelihood of each of the capacitors selected for the capacitor banks, and electrical characteristics exhibited by a respective capacitor of the capacitors when the respective capacitor fails, and an isolation mechanism adapted to electrically isolate any capacitor banks of the capacitor banks that suffer capacitor failures.

12. The storage device of claim 11, wherein the capacitor banks are over provisioned with respect to a quantity of power necessary to complete a shutdown procedure for the storage device.

13. The storage device of claim 11, wherein the isolation mechanism is adapted to electrically isolate each of the capacitor banks that has suffered a capacitor failure from other capacitor banks of the capacitor banks that have not suffered any capacitor failures.

14. The storage device of claim 13, wherein the isolation mechanism comprises diodes that that are positioned to isolate output for each of the capacitor banks.

15. The storage device of claim 14, wherein the isolation mechanism further comprises current limiters that limit current draw by each of the capacitor banks.

16. The storage device of claim 13, wherein the isolation mechanism comprises transistors that are adapted to selectively electrically float each of the capacitor banks.

17. The storage device of claim 16, wherein the isolation mechanism comprises a local controller adapted to use the transistors to selectively electrically float each of the capacitor banks based on a state reading of the capacitor banks.

18. The storage device of claim 17, wherein the local controller is adapted to:

monitor a charge level of the capacitor banks; and in an instance of the charge level being below a threshold:

perform a diagnostic procedure to identify any of the capacitor banks that have suffered a capacitor failure.

19. The storage device of claim 18, wherein the local controller is further adapted to:

send control signals to the transistors corresponding to the any of the capacitor banks that have suffered the capacitor failures to float the any of the capacitor banks that have suffered the capacitor failures, wherein the controls signal electrically isolate the transistors corresponding to the any of the capacitor banks that have suffered the capacitor failures from a ground for the storage device to eliminate voltage potentials across the transistors corresponding to the any of the capacitor banks that have suffered the capacitor failures.

20. The storage device of claim 11, wherein the target life of the storage device indicates a number of years that the storage device is expected to be operational, each of the capacitor banks comprises more than one capacitor that are all connected in parallel with one another, and a failure of one capacitor of a first capacitor bank of the capacitor banks causes all capacitors making up the first capacitor bank, including even non-failed capacitors, to be removed from use from the power protection circuitry by the isolation mechanism.

* * * * *